United States Patent
Rostrom

(10) Patent No.: US 7,920,441 B2
(45) Date of Patent: Apr. 5, 2011

(54) OPTIMIZED TIME ACQUISITION ALGORITHM FOR LOW-POWER GPS-BASED WATCH APPLICATIONS

(75) Inventor: Juha Tapani Rostrom, Tampere (FI)

(73) Assignee: Atheros Communications, Inc., San Jose, CA (US)

( * ) Notice: Subject to any disclaimer, the term of this patent is extended or adjusted under 35 U.S.C. 154(b) by 0 days.

(21) Appl. No.: 11/835,914

(22) Filed: Aug. 8, 2007

(65) Prior Publication Data

US 2008/0074950 A1    Mar. 27, 2008

Related U.S. Application Data

(63) Continuation-in-part of application No. 11/534,148, filed on Sep. 21, 2006.

(51) Int. Cl.
*G04C 11/02* (2006.01)
*G04B 47/06* (2006.01)

(52) U.S. Cl. .......................................... 368/47; 368/14

(58) Field of Classification Search .................... 368/47, 368/14, 46; 342/357.2, 357.22, 357.39, 357.46
See application file for complete search history.

(56) References Cited

U.S. PATENT DOCUMENTS

| 6,212,133 | B1 * | 4/2001 | McCoy et al. ........................ 368/9 |
| 6,278,660 | B1 * | 8/2001 | Tognazzini ........................ 368/21 |
| 6,750,813 | B2 * | 6/2004 | Vargas-Hurlston et al. .......................... 342/357.4 |
| 2003/0027529 | A1 * | 2/2003 | Haugli et al. ................. 455/67.1 |
| 2005/0148306 | A1 * | 7/2005 | Hiddink ......................... 455/101 |
| 2009/0059841 | A1 * | 3/2009 | Laroia et al. ................... 370/328 |

FOREIGN PATENT DOCUMENTS

| JP | 07-312590 | * 11/1995 |
| JP | 11-146375 | * 5/1999 |
| JP | 2001-326592 | * 11/2001 |

* cited by examiner

*Primary Examiner* — Sean Kayes
(74) *Attorney, Agent, or Firm* — Bay Area Technology Law Group PC

(57) ABSTRACT

A GPS enabled timepiece. A Global Positioning System (GPS) enabled timepiece in accordance with the present invention comprises a timepiece, the timepiece comprising a local oscillator, and a GPS receiver, coupled to the timepiece, the GPS receiver using the local oscillator to predict a time arrival of a GPS message from a GPS satellite, wherein the GPS receiver is powered on based on the predicted time.

16 Claims, 4 Drawing Sheets

OPTIMIZED TIME ACQUISITION ALGORITHM FOR LOW-POWER GPS-BASED WATCH APPLICATIONS

CROSS-REFERENCE TO RELATED APPLICATIONS

This application is a continuation-in-part of U.S. patent application Ser. No. 11,534,148, entitled "GPS RECEIVER FOR TIMEKEEPING APPLICATIONS," by Keith J. Brodie et al., which application is incorporated by reference herein.

BACKGROUND OF THE INVENTION

1. Field of the Invention

The present invention relates generally to Global Positioning System (GPS) receivers, and in particular, to a GPS receiver designed for timekeeping applications.

2. Description of the Related Art

The use of GPS in consumer products has become commonplace. Hand-held devices used for mountaineering, automobile navigation systems, and GPS for use with cellular telephones are just a few examples of consumer products using GPS technology.

As GPS technology is being combined with these devices, the GPS chips are being placed in widely ranging applications. Initially, GPS chips were designed for surveying applications, and, as such, the chip and system design was engineered to provide highly accurate positioning measurements and data, without regard to power consumption, semiconductor chip footprint, or other conditions. The GPS chip design was optimized to deliver position data, rather than optimized for each environment the chip is being placed into. Further, some of the GPS portions are being made on the same semiconductor chip as other portions of the combined devices, which subjects the GPS portions of these electronic devices to widely-varying semiconductor processing steps.

Since the GPS chips are now being placed into devices that are far afield from the initial intended use for GPS, it can be seen, then, that there is a need in the art to alter the design of a GPS chip to match the requirements of the intended end-user device and environment.

SUMMARY OF THE INVENTION

To minimize the limitations in the prior art, and to minimize other limitations that will become apparent upon reading and understanding the present specification, the present invention discloses a GPS chip that is optimized for timekeeping applications, and timepieces comprising such receivers. A Global Positioning System (GPS) enabled timepiece in accordance with the present invention comprises a timepiece, the timepiece comprising a local oscillator, and a GPS receiver, coupled to the timepiece, the GPS receiver using the local oscillator to predict a time arrival of a GPS message from a GPS satellite, wherein the GPS receiver is powered on based on the predicted time.

Such a timepiece further optionally includes the GPS receiver providing time updates to the timepiece, the time updates are provided on a periodic basis, the time updates are also used to calibrate a drift of an internal oscillator in the GPS receiver, the local oscillator drift is used to predict the time arrival of the GPS message, and a position determined by the GPS receiver is displayed on the timepiece.

A method for correcting time offsets in a GPS-enabled timepiece in accordance with the present invention comprises determining a preferred time to power on a GPS receiver portion of the GPS-enabled timepiece, using a local oscillator to calculate the preferred time, looking for at least one identifiable section in a received navigation message of a GPS signal received by the GPS receiver portion after powering on at the preferred time, determining a correct time using the identifiable section of the received navigation message, and correcting a time in the GPS-enabled timepiece using the determined correct time.

Such a method further optionally comprises the correcting being done on a periodic basis, a period of the periodic basis being determined by an average time error of the timepiece, the average time error being determined at least by a drift rate of the local oscillator, the preferred time to power on the GPS receiver portion being selected to reduce the average time to acquire a GPS signal, the identifiable section of the received navigation message being a Time Of Week (TOW) signal, and the identifiable section of the received navigation message being a TLM word of a first subframe.

A GPS-enabled timepiece, wherein a GPS portion of the GPS-enabled timepiece calibrates the GPS-enabled timepiece to display the correct time on a periodic basis in accordance with the present invention comprises means for determining a preferred time to power on a GPS receiver portion of the GPS-enabled timepiece, means for using a local oscillator to calculate the preferred time, means for looking for at least one identifiable section in a received navigation message of a GPS signal received by the GPS receiver portion after powering on at the preferred time, means for determining a correct time using the identifiable section of the received navigation message, and means for correcting a time in the GPS-enabled timepiece using the determined correct time.

Such a timepiece further optionally comprises the time updates are also used to calibrate a drift of an internal oscillator in the GPS receiver, a local oscillator drift is used to predict the time arrival of the GPS message, and a position determined by the GPS receiver is displayed on the timepiece.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a GPS chip that is optimized for specific applications, namely, timekeeping applications. The GPS system typically is used to determine position of a user, rather than determining time for the user. However, accurate time is a by-product of the GPS position determination, and, as such, is available for presentation to a user.

Typically, timekeeping environments, such as wrist watches, are low power environments. As such, the GPS receivers used for other applications, such as automobiles, dedicated GPS navigation units, and cellular telephones, will not be successful in a watch or other timekeeping environment, because these other GPS receivers will consume too much power.

In low power time applications, such as wrist watches, all functions of the applications must use minimum power such that the battery powering the device can provide an acceptable minimum lifetime. Typical GPS receivers use significant power when acquiring one or more satellites for position and/or time calculations. This invention seeks to reduce the power consumed by the GPS search function by optimizing the search logic.

Further, by shifting the focus of the GPS receiver from position reporting to time reporting, many functions previously required by the GPS receiver are no longer necessary.

The present invention provides a highly accurate, low cost means for keeping time in a variety of timepiece applications. The invention uses an optimized GPS receiver whose primary function is to calculate and report accurate time, and therefore navigation is not required. The invention combines a reduced set of GPS assets (search engine, tracking correlators, etc.) with sufficient processing elements and peripherals in order to form a complete timekeeping system. All key elements of the invention can be integrated into a single semiconductor device if desired. By reducing the GPS specific asset to the minimum required to obtain accurate time, the invention achieves power consumption levels and cost levels that uniquely address high volume consumer timekeeping applications. Power consumption is critical so the device is further optimized through the selection of best-fit wafer process technology. The resulting device will occupy less than one-half the semiconductor area of a current GPS processor and will replace the existing components used in present-art timepieces.

Block Diagram

Figure 1:
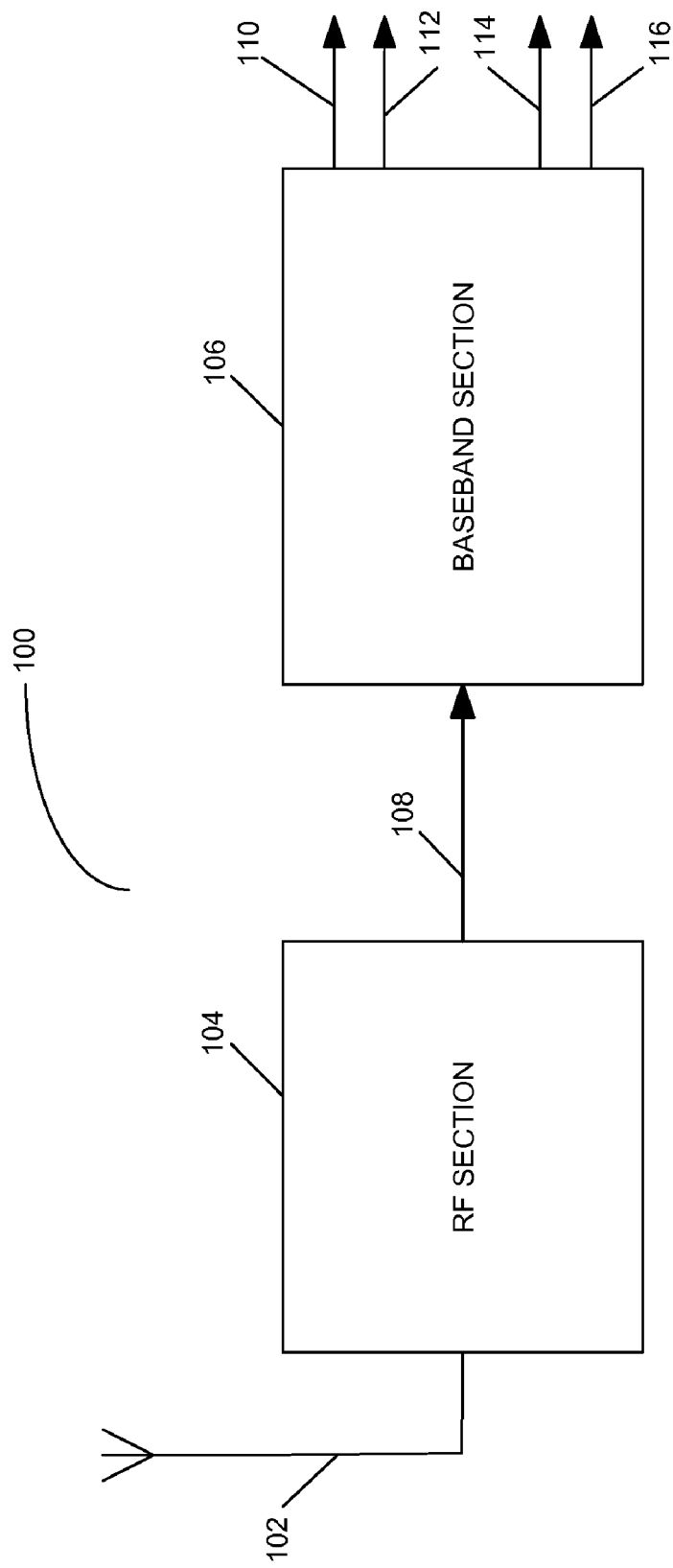
FIG. 1 illustrates a top-level block diagram of a GPS receiver.

FIG. 1 illustrates a top-level block diagram of a GPS receiver.

Receiver 100 typically comprises an antenna 102, a Radio Frequency (RF) section 104, and a baseband section 106. Typically, antenna 102 receives signals that have been transmitted by a GPS satellite, that are then amplified and down-converted in the RF section 104. RF section 104 then sends signals 108 to baseband section 106 for processing and position determination. Signals 108 typically include an oscillator signal, an in-phase signal, a quadrature-phase signal an Automatic Gain Control (AGC) signal, and other signals.

Baseband section 106 generates multiple outputs 110-116, e.g., Doppler, pre-processed Intermediate Frequency (IF) data, integrated phase, pseudorange, time, velocity, position, etc.

Figure 2:
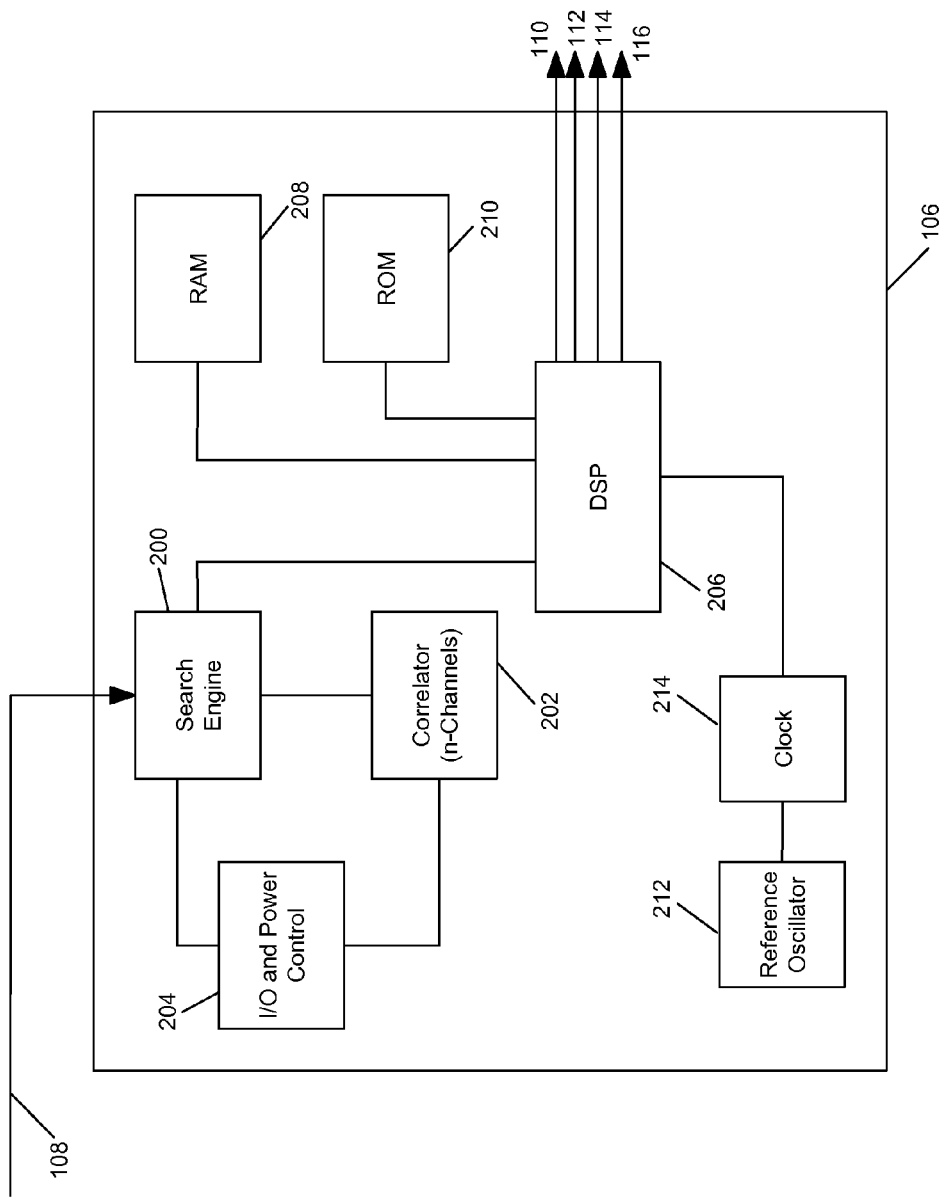
FIG. 2 illustrates a diagram of the baseband section of a GPS receiver.

FIG. 2 illustrates a diagram of the baseband section of a GPS receiver. Baseband section 106 receives signals 108 from the RF section 104, and uses search engine 200 and correlator 202 to process the signals 108 to obtain useful data. Input/Output (I/O) control 204 is coupled to search engine 200 and correlator 202 to manage the power and data flow for search engine 200 and correlator 202. Alternatively, the architecture may comprise only a correlator 202, which is then used for both searching and tracking purposes, which can be modified for reduced power consumption as described herein as well.

DSP 206 accesses RAM 208 and ROM 210 for various programming steps that are used to process the data discovered by search engine 200 and correlator 202. DSP then generates the output signals 110-116.

Because a typical GPS receiver 100 must be able to navigate (track satellites for a given amount of time) and generate position for a given period of time, e.g., for a minute or two, the receiver 100 must store a lot of data in the RAM 208 and ROM 210. However, a GPS receiver in accordance with the present invention needs less RAM 208 and ROM 210, because tracking and navigation functions are severely limited, or not needed at all, since position is not the primary focus of the present invention. For example, a typical GPS receiver 100 baseband section 106 requires about 64 k of RAM 208, and about 1 k of ROM 210. A GPS receiver 100 baseband section 106 in accordance with the present invention could use approximately 16 k of RAM 208 and about 1 k of ROM 210, or, alternatively, the entire memory requirements of the receiver 100 of the present invention would place all of the memory in ROM 210, eliminating the RAM 208 altogether. Such a reduction or elimination of RAM 208 not only saves power, but saves semiconductor real estate, and makes design and testing of the receiver 100 chip easier.

The memory requirements of the GPS processor can also be reduced because the GPS is not used to navigate. Therefore navigation features (such as Kalman filters, heading filters, re-acquisition, datums, etc.) are not required in the application software. The GPS measurement layer software can also be optimized based on the assumption that position accuracy is not important. The resulting simplified GPS software can then be coded into ROM for further cost reduction.

Further, the search engine 200, correlator 202, and DSP 206 can be optimized to reduce power consumption, because rather than trying to find several GPS satellites and process the signals simultaneously the receiver need only find one satellite to acquire time and three satellites to calculate the time zone where the receiver is located. Alternatively, the architecture may comprise only a correlator 202, which is then used for both searching and tracking purposes, which can be modified for reduced power consumption as described herein as well. The correlator 202 and search engine 200 can be further optimized to only look for signals that meet a certain signal strength threshold as well, and if such signals are not found in a certain amount of time, the search engine 200 and correlator 204 can shut off, conserving power.

Further, tracking of GPS satellites can be limited for the GPS receiver 100, e.g., to a maximum number of satellites at a time, and have limited functionability, e.g., no navigation capability, which would reduce DSP 206 processing power requirements and DSP 206 power consumption. Other power reduction techniques can be made by clocking the DSP 206 at a reduced speed or by reducing the duty cycle for processing.

To properly synchronize the signals, etc, that are being processed, the DSP 206 (and, possibly, the con elators 202, search engine 200, etc), are connected to a reference oscillator 212 and/or clock 214. The reference oscillator 212 is typically a crystal, a Temperature Controlled Crystal Oscillator (TCXO), or other stable oscillating source, which is then either upconverted or downconverted by the clock 214 to generate frequencies of interest. These oscillators can also be used with the RF section 104 if desired.

Application to Timekeeping Environments

Figure 3:
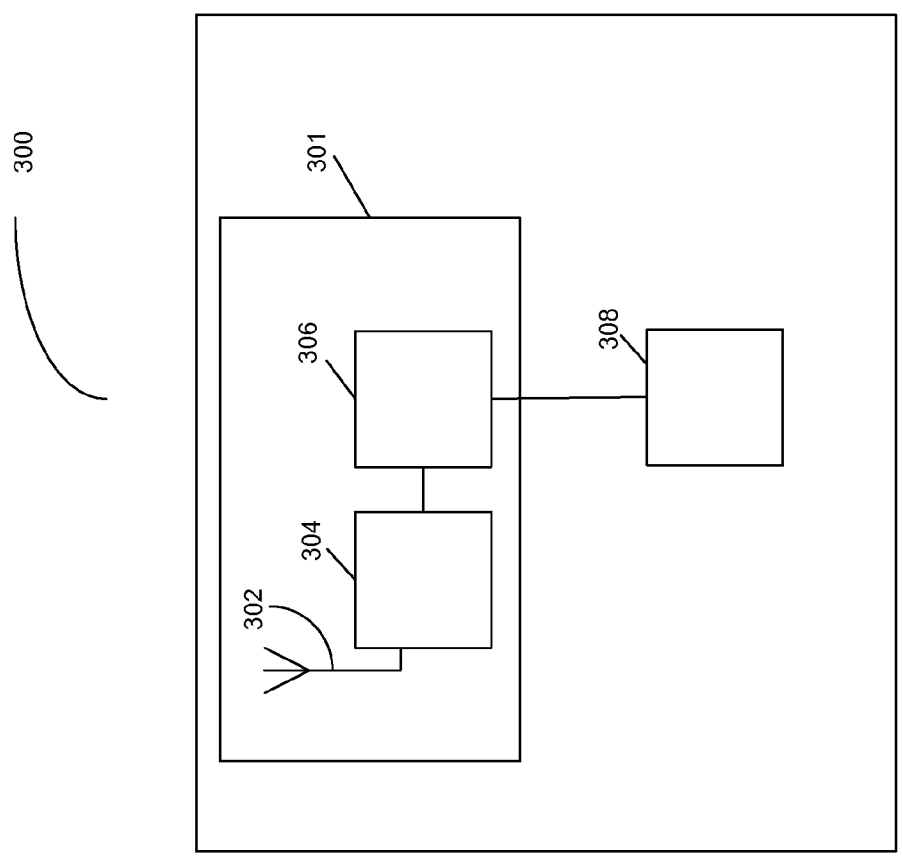
FIG. 3 illustrates a timepiece in accordance with the present invention.

FIG. 3 illustrates a timepiece in accordance with the present invention.

Currently, the state-of-the-art for timepieces 300 is to use a dedicated watch processor and watch crystal to manage all timekeeping functions. The accuracy of the timepiece is thus determined by the accuracy of the watch crystal.

The present invention uses a GPS received 301, which can comprise an optimized GPS antenna 302, an optimized GPS RE section 304, and/or an optimized GPS baseband section 306, which uses an internal clock 214, a local reference oscillator 212 such as a TCXO, for the GPS related functions of timepiece 300 and display 308. The timepiece 300 of the present invention and acquires GPS time in order to manage all timekeeping functions 308.

Clock 214 may still reside in the GPS receiver 301, and if so, the timepiece 300 uses a separate oscillator to keep accurate time. However, all oscillators may be slaved to clock 214, or timepiece 300 may only have one clock 214 used to clock all of the electronics in timepiece 300 if desired.

Timepiece 300 applications for GPS receivers 100 typically use a crystal oscillator 212 to keep track of time. Oscillators 212 typically have a significant frequency offset, and consequently the time reported by the timepiece 300 will drift further away from the correct value as time passes.

In GPS-based timepiece 300 applications this drift and therefore time error can be cancelled by periodically acquiring GPS signals to acquire an essentially offset-free (precise) time estimate and use this information to refresh the local oscillator-based time estimate. However, this periodic acquisition consumes significant amounts of energy, and therefore limits the battery life of watch applications. The present invention described herein reduces the average amount of energy consumed by the GPS-based time acquisition process.

Accuracy and Timepiece Calibration

The initial time for timepiece 300 is set and tracked using the internal clock 214, typically set at 32 kHz, of the GPS baseband section 306. At given intervals, the GPS processor 206 acquires GPS time and uses that time to correct the present time of timepiece 300 and to calibrate drift of the internal oscillator 212. This allows the accuracy of the timepiece 300 to be determined by the drift in the internal oscillator 212, the calibration algorithm used by DSP 206, and the update frequency of the GPS time information. This results in significant improvement in timing accuracy for the timepiece 300.

The update rate for obtaining GPS time using the GPS receiver 301 of the present invention is important in managing the power consumption of the timepiece 300. For example, it may be more power efficient to acquire GPS time more frequently such that the GPS receiver 301 is always able to perform a hot start rather than performing a cold start at longer intervals. Such an approach may also affect the general accuracy of the timepiece 300. Having multiple algorithms for use of the GPS receiver portion 301 may allow the timepiece 300 to have price differentiation through software versions that provide increasing or decreasing levels of time accuracy for the timepiece 300, e.g., 1 second/month accuracy, 1 second/week, 1 second/day, etc.

The GPS receiver 301 can also self-calibrate the internal oscillator 212, which will be important in determining the rate of time error between GPS time acquisition periods. If the calibration algorithm takes into account temperature, voltage, etc., the calibration algorithm will reduce the oscillator error and enable longer periods between GPS time acquisitions.

GPS Message Parsing and Predicting Message Arrival

The present invention combines the use of constrained-error local time estimate and GPS navigation message synchronization characteristics together with application-induced limited accuracy requirements to make it easier for receiver 301 to acquire the information it needs to achieve a time estimate. Further, the present invention allows the acquisition to take place at reduced power consumption for devices such as timepiece 300 that has minimal power reserves.

Typically, the average maximum time error of a timepiece 300 is on the order of 1 second. This average error can be designated a desired maximum error or a desired average error, and, in either case, helps to determine the refresh rate such that the error is eliminated on a periodic basis. The refresh rate of the oscillator 212, or, alternatively, the acquisition rate of GPS correction signals via receiver 301, must be made often enough to support correction of the timepiece 300, which is typically once per day. Since the signal transit time from GPS satellites to receiver 301 is on the order of seventy-five milliseconds and the uncertainty in this time is on the order of ten milliseconds, the transit time error can be ignored, and no navigation solution is needed for receiver 301.

Navigation Message Information

Since GPS navigation message subframes are six seconds long, if the local time estimate, e.g., the time being presented by the timepiece 300 is within ±3 seconds of the correct (actual) time, the receiver 301, through the shared knowledge of the timepiece 300 time, knows which subframe is currently being transmitted by the satellites, or, alternatively, which subframe the next received "start of subframe" message is associated with.

Since the navigation message words are 0.6 seconds long, a ±0.3 second estimate accuracy is needed by receiver 301 to know which navigation message word will be next. The typical accuracy of ±1 second for timepiece 300 thus corresponds to about ±1.7 subframes of accuracy. The present invention uses this ±1 second accuracy to reduce the amount of data that needs to be decoded and interpreted by receiver 301.

For initial startup of receiver 301, to get all the information needed to compute UTC time and date based on GPS navigation data only, the receiver 301 must decode week number and time-of-week (TOW) from the navigation message words of the received signals. However, this needs to be done only once after powering on the receiver 301, since sufficiently accurate time estimate can be kept up to date using the local oscillator 212 that timepiece 300 uses to report time.

Thus, after this initial time acquisition a reduced-length time acquisition process can be used as follows. First, the GPS receiver 301 uses the oscillator 212 time estimate to determine what time to start up, i.e., power on, the GPS receiver 301 at an optimal time, and, given this optimal time, the GPS receiver 301 looks for any and all uniquely identifiable sections in the received navigation message using the a priori knowledge on which subframe and word should be coming up next in the GPS message. The receiver 301 start-up time (the optimal time above) is selected in such a way that completion of satellite acquisition and start of navigation message decoding is most likely to happen just before an identifiable message pattern, e.g., TLM word of subframe 1, or, more preferably, just before a sequence of identifiable patterns, such that the receiver 301 can be powered on for a minimal amount of time to acquire the correction signals.

In essence, since the receiver 301 knows the time accurately enough from the oscillator 212 of timepiece 300, receiver 301 can predict what part of navigation message receiver 301 should be receiving at any given time, and use a more optimal time-sync method, capable of reducing the average time to acquire time synchrony, and thus reducing average energy required for such transactions.

Even when the acquisition takes longer than expected, the capability of synchronizing to multiple locations within the navigation message or to any subframe, the receiver no longer needs to wait a time amount uniformly distributed between 0.6 to 6.6 seconds to catch the next TOW transmission. Instead, the time acquisition for receiver 301 is now possible in a time non-uniformly distributed between 0.6 and <6.6 s in such a way that the probability density is nearer to 0.6 rather than 6.6 s, and thus the average time is less than 3.6 seconds, which it would be in a uniform distribution. Since the GPS-synchronization using the GPS receiver 301 will be done periodically over a long term, the statistical properties such as average energy consumption per synchronization sequence determine the total battery life, and optimizing this reduction in power consumption therefore extends the battery life for timepiece 300.

Further, the present invention can be used in conjunction with measuring oscillator 212 drift or cycle duration against the GPS-synchronized time provided by the GPS receiver 301, and using this offset estimate in the receiver 301 acquisition process.

Automatic Time Zone Adjustment

Presently, timepieces 300 do not have the capability to automatically adjust the time to account for traveling into a different time zone worldwide. Typically, a user must reset the time manually, however, some present timepieces utilize timing information (transmitted on AM radio) in order to adjust time. However these AM radio style solutions are limited to certain regions/countries as the radio signals are not available in all countries and each country uses different transmit frequencies.

A timepiece 300 in accordance with the present invention now has the ability to automatically adjust time of day to match the present time zone in which the timepiece is located. The GPS antenna 302, RF section 304, and baseband section 306, even though optimized for time calculations, can provide a rough position of the timepiece 300. Based on that rough position, timepiece 300 will have a rough position, and can adjust the time display based on this rough positioning of the timepiece 300. The accuracy of the rough positioning determined by timepiece 300 will depend on the aging of the almanac but probably around a couple km, and if such accuracy is not sufficient to determine timezone and/or city, lookup tables or other methods can be used to provide such data to timepiece 300.

The GPS receiver of the present invention can use almanac information for the satellites to compute a coarse position, typically with an error of a kilometer or more, which is sufficient to fix the timezone for timepiece 300. The advantage of using the almanac is that it is useful for long periods, months or more, so the timezone can be computed quickly without decoding the ephemeris data from the GPS satellite—which can take up to thirty seconds once the satellite is in track, and longer if the timepiece 300 is acquiring the satellite signal.

The timepiece 300 can also make some positions assumptions, such as we are at zero altitude, to reduce the number of measurements required to produce a position fix. Typical errors are 100-300 m in position error from using 3 satellites and an assumed altitude.

The timepiece 300 of the present invention can also make an assumption about being substantially static such that Doppler measurements can be used to help estimate position. Further, the timepiece 300 can make a Doppler-only position estimate with a rough estimate of time if such a "static" assumption is made, and GPS data can be avoided altogether in the time determination. Positioning errors in such a scenario may be larger than using GPS data, e.g., 10-50 km errors in terms of positioning, but such an approach is still useful to determine timezone and assistance in terms of determining time for timepiece 300.

The timepiece 300 of the present invention can also implement a "hot start" approach, which uses ephemeris, time, and position, or a Warm start, which uses almanac, time, and position, to assist timepiece 300 in determining a new position. Such an approach may reduce power and duty cycle if timepiece 300 does not collect ephemeris data and relies on almanac data for determining rough position, but accurate time. Further, timepiece 300 may occasionally use ephemeris data to update the almanac data if desired.

Adjustment of the present time of day displayed on a given timepiece 300, depending on whether the timepiece 300 is a digital or analog timepieces 300, may be different based on the type of timepiece 300. For example, on an analog timepiece 300, specific algorithms may be employed to determine the best way to move the hour hand and/or minute hand that will conserve power during time adjustment and/or time zone changes for that timepiece 300.

Further, the current time zone and approximate location, e.g., town or city name, country name, etc., can be displayed on the timepiece 300 if desired. Such information can be stored in ROM 210 or RAM 208, and a look-up table can be used to retrieve such information.

Searching for GPS Signals

Timepieces 300 in accordance with the present invention are optimized to reduce power consumption, and, as such, typically have a reduced processing capability, reduced sensitivity, etc. As such, the timepiece 300 must look for GPS signals at a time most likely to find such signals, and at times when those signals are most likely to be strong signals. As discussed above, receiver 301 start-up time can be selected in such a way that completion of satellite acquisition and start of navigation message decoding is likely to happen just before an identifiable message pattern, e.g., Telemetry (TLM)—word of subframe 1, or, more preferably, just before a sequence of identifiable patterns, since a reduced amount of data is needed to acquire time.

Such an intelligent search strategy reduces the acquisition time for GPS signals, as well as reducing the power consumption during acquisition of the GPS signals for a timepiece 300. Such a strategy would likely include only performing signal searches down to a specified signal level, e.g., −130 dBm, and terminating acquisition if none are found. Other factors that may be employed by such a search strategy include of time of day, motion sensors, and, possibly, multiple minimum signal strength thresholds, as well as how long it has been since the last calibration and known drift of the oscillator 212, in order to determine if a search should be conducted. Further, timepiece 300 can be programmed to search for weaker GPS signals if necessary, even below the data decoding threshold, as well as allowing for overriding of the signal level thresholds altogether.

To optimize a search by time of day, search logic used by the search engine 200 predicts the probability of the location of the timepiece 300 at a given time. For example, there is a high probability that a wristwatch will be located inside of a building, e.g., (house, apartment, hotel, etc.) during normal sleep hours, or that a postal truck has a high probability of being on the road during normal work hours. By using knowledge of these conditions, the GPS receiver can be programmed such that it enables satellite searching only during the time of day when the application is least likely to be in weak signal environments, such as inside a structure. The search algorithm might also collect statistical success rate of acquisition and use those statistics to predict the most likely time to perform the next search. This algorithm would take into account the days of the week such as well as the times of day.

Further, the search logic used by the search engine 200 is set such that the search engine 200 will only search for signals that are stronger than a pre-determined level. This pre-determined level is set according to the given application. When the search function of the search engine 200 is enabled, the timepiece 300's GPS receiver searches until it reaches the pre-determined level. If no satellites are found, the receiver is placed in sleep mode for a given period of time. At the end of the given period of time, the receiver can be enabled for another search. This procedure can be repeated until the required satellite acquisition is achieved, a specific number of attempts have been made, or other reasons for stopping the search pattern can be used. The pre-determined threshold can be set to meet the power requirements of the timepiece 300. For example, the signal threshold may be set such that the receiver can complete a full sky search in less than 1 second, thereby limiting the power consumed when strong signals are not available. The interval between searches can also be set based on the update rate required by the timepiece 300.

Some timepieces 300 are equipped with motion sensors as part of timekeeping functions 308. Such motion sensors include sensors that determine altitude, etc. If the timepiece has such motion sensors, the sensor output can be used to determine the most likely conditions for beginning a search.

Wristwatch Application of the Invention

A typical timepiece, e.g., a wrist watch, loses 15 seconds/month. To reset the time of day on such a watch, a GPS time acquisition must occur every two days in order to keep time with a timepiece 300 equipped with the present invention to maintain a one second accuracy. Typically, a wristwatch is indoors during sleep hours, and at various times during wake hours will be in strong signal conditions.

As such, search logic used by search engine 200 can be set such that no search is attempted between the hours of 11:00 PM and 6:30 PM, and a minimum signal strength of signals to be acquired can be set at −130 dBm. If sensors are available, the search would take place when motion is detected and the time is between 6:30 AM and 11:00 PM.

Application Specific Performance Issues

Because the GPS receiver of the present invention has been optimized for a specific timekeeping environment, other portions of the GPS receiver also can be redesigned. For example, since location accuracy and high sensitivity are not as important to the GPS receiver of the present invention, the GPS antenna 102 performance is less critical, and therefore, can have less gain or different antenna patterns than those used by typical GPS receivers.

Flowchart

Figure 4:
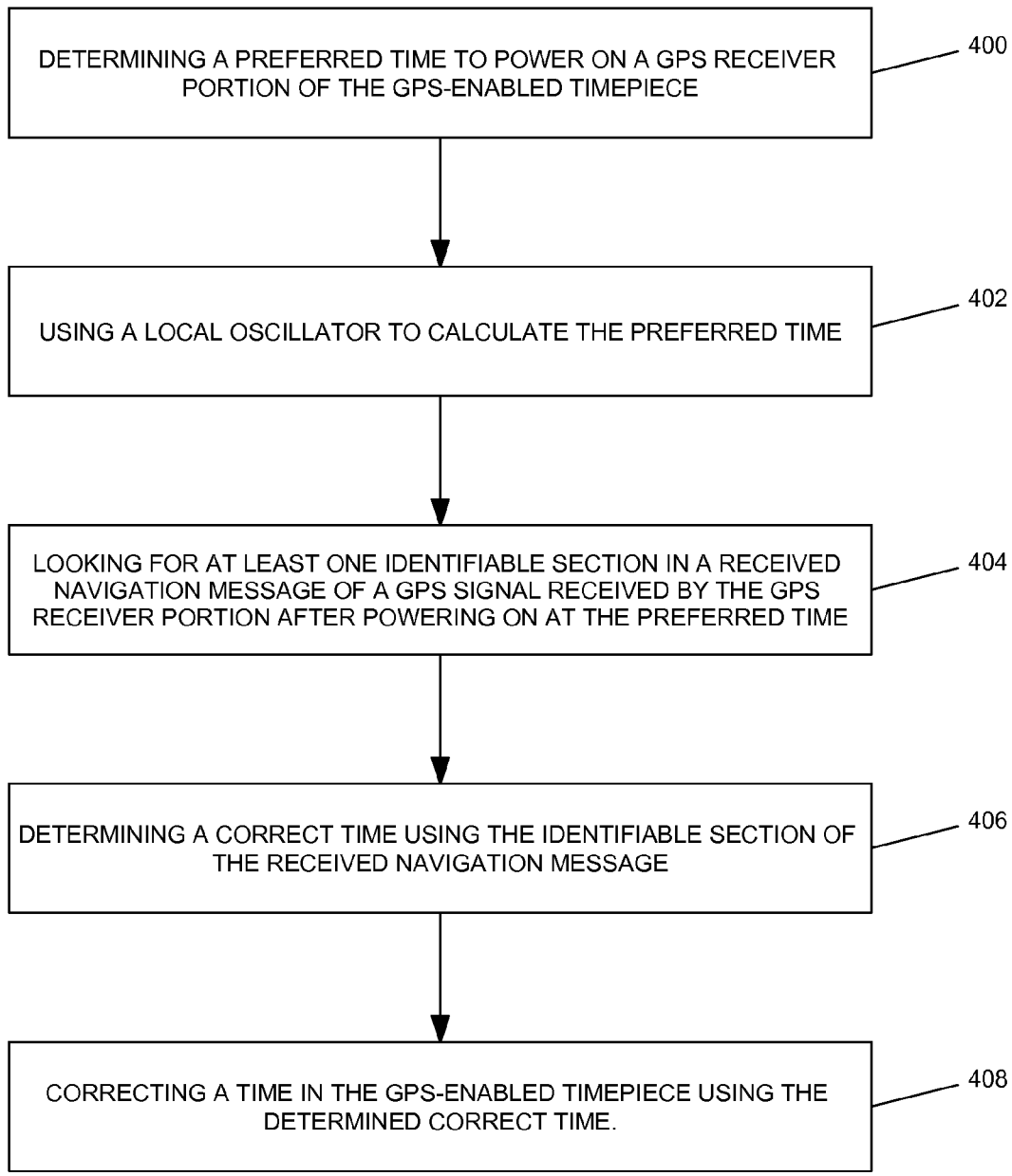
FIG. 4 is a flowchart illustrating the process used in accordance with the present invention.

FIG. 4 is a flowchart illustrating the process used in accordance with the present invention.

Box 400 illustrates determining a preferred time to power on a GPS receiver portion of the GPS-enabled timepiece.

Box 402 illustrates using a local oscillator to calculate the preferred time.

Box 404 illustrates looking for at least one identifiable section in a received navigation message of a GPS signal received by the GPS receiver portion after powering on at the preferred time.

Box 406 illustrates determining a correct time using the identifiable section of the received navigation message.

Box 408 illustrates correcting a time in the GPS-enabled timepiece using the determined correct time.

CONCLUSION

This concludes the description of the preferred embodiment of the invention. The following describes some alternative embodiments for accomplishing the present invention.

This invention is optimized for a wide range of consumer timepiece applications. The primary application is any wrist watch that uses an electronic movement and/or digital display. The invention can also be used in automotive clocks, PDA clocks, digital cameras, and any other application in which accurate time is valuable. In each of these applications, the invention can replace or assist the existing watch/clock processor.

It may be possible to achieve similar function by using time information embedded in television signals, however the cost, size, and power of such a method may not be compatible with the applications identified above.

The invention may also be useful in cellular base stations, commercial digital clocks, traffic light synchronization, etc.

In summary, the present invention describes a GPS receiver which is optimized or modified to operate in timekeeping environments, and timepieces comprising such receivers. A Global Positioning System (GPS) enabled timepiece in accordance with the present invention comprises a timepiece, the timepiece comprising a local oscillator, and a GPS receiver, coupled to the timepiece, the GPS receiver using the local oscillator to predict a time arrival of a GPS message from a GPS satellite, wherein the GPS receiver is powered on based on the predicted time.

Such a timepiece further optionally includes the GPS receiver providing time updates to the timepiece, the time updates are provided on a periodic basis, the time updates are also used to calibrate a drift of an internal oscillator in the GPS receiver, the local oscillator drift is used to predict the time arrival of the GPS message, and a position determined by the GPS receiver is displayed on the timepiece.

A method for correcting time offsets in a GPS-enabled timepiece in accordance with the present invention comprises determining a preferred time to power on a GPS receiver portion of the GPS-enabled timepiece, using a local oscillator to calculate the preferred time, looking for at least one identifiable section in a received navigation message of a GPS signal received by the GPS receiver portion after powering on at the preferred time, determining a correct time using the identifiable section of the received navigation message, and correcting a time in the GPS-enabled timepiece using the determined correct time.

Such a method further optionally comprises the correcting being done on a periodic basis, a period of the periodic basis being determined by an average time error of the timepiece, the average time error being determined at least by a drift rate of the local oscillator, the preferred time to power on the GPS receiver portion being selected to reduce the average time to acquire a GPS signal, the identifiable section of the received navigation message being a Time Of Week (TOW) signal, and the identifiable section of the received navigation message being a TLM word of a first subframe.

A GPS-enabled timepiece, wherein a GPS portion of the GPS-enabled timepiece calibrates the GPS-enabled timepiece to display the correct time on a periodic basis in accordance with the present invention comprises means for determining a preferred time to power on a GPS receiver portion of the GPS-enabled timepiece, means for using a local oscillator to calculate the preferred time, means for looking for at least one identifiable section in a received navigation message of a GPS signal received by the GPS receiver portion after powering on at the preferred time, means for determining a correct time using the identifiable section of the received navigation message, and means for correcting a time in the GPS-enabled timepiece using the determined correct time.

Such a timepiece further optionally comprises the time updates are also used to calibrate a drift of an internal oscillator in the GPS receiver, a local oscillator drift is used to predict the time arrival of the GPS message, and a position determined by the GPS receiver is displayed on the timepiece.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the full range of equivalents to the claims thereof.

What is claimed is:

1. A Global Positioning System (GPS) enabled timepiece, comprising:
    a timepiece, the timepiece comprising a local oscillator; and
    a GPS receiver, coupled to the timepiece, the GPS receiver using at least the local oscillator and an intelligent search strategy which includes acquiring GPS correction signals at least one time of day, responding only to GPS signals meeting a signal strength threshold, and collecting statistical success rates of acquisition to predict a time at which the timepiece is expected to have improved signal reception, wherein the GPS receiver is powered on based on the predicted time.

2. The GPS enabled timepiece of claim 1, wherein the GPS receiver provides time updates to the timepiece.

3. The GPS enabled timepiece of claim 2, wherein the time updates are provided on a periodic basis.

4. The GPS enabled timepiece of claim 1, wherein the time updates are also used to calibrate a drift of an internal oscillator in the GPS receiver.

5. The GPS enabled timepiece of claim 4, wherein the local oscillator drift is used to predict the time arrival of the GPS message.

6. The GPS enabled timepiece of claim 1, wherein a position determined by the GPS receiver is displayed on the timepiece.

7. A method for correcting time offsets in a GPS-enabled timepiece, comprising:
    determining a preferred time to power on a GPS receiver portion of the GPS-enabled timepiece;
    using at least a local oscillator and an intelligent search strategy to calculate the preferred time, wherein the intelligent search strategy includes the steps of acquiring GPS correction signals at least one time of day, responding only to GPS signals meeting a signal strength threshold, and collecting statistical success rates of acquisition to predict a time at which the timepiece is expected to have improved signal reception and to power on the GPS receiver portion of the GPS-enabled timepiece at the predicted time;
    looking for at least one identifiable section, a telemetry word of a first subframe, in a received navigation message of a GPS signal received by the GPS receiver portion after powering on at the preferred time;
    determining a correct time using the identifiable section of the received navigation message; and
    correcting a time in the GPS-enabled timepiece using the determined correct time.

8. The method of claim 7, wherein the correcting is done on a periodic basis.

9. The method of claim 8, wherein a period of the periodic basis is determined by an average time error of the timepiece.

10. The method of claim 9, wherein the average time error is determined at least by a drift rate of the local oscillator.

11. The method of claim 9, wherein the preferred time to power on the GPS receiver portion is selected to reduce the average time to acquire a GPS signal.

12. The method of claim 7, wherein the identifiable section of the received navigation message is a Time Of Week (TOW) signal.

13. A GPS-enabled timepiece, wherein a GPS portion of the GPS-enabled timepiece calibrates the GPS-enabled timepiece to display the correct time on a periodic basis, comprising:
    means for using at least a local oscillator and an intelligent search strategy to calculate the preferred time, and wherein the intelligent search strategy comprises means for acquiring GPS correction signals at least one time of day, means for responding only to GPS signals meeting a signal strength threshold, and means for collecting statistical success rates of acquisition to predict a time at which the timepiece is expected to have improved signal reception and to power on the GPS receiver portion of the GPS-enabled timepiece at the predicted time;
    means for determining a correct time using the identifiable section of the received navigation message; and
    means for correcting a time in the GPS-enabled timepiece using the determined correct time.

14. The GPS-enabled timepiece of claim 13, wherein the time updates are also used to calibrate a drift of an internal oscillator in the GPS receiver.

15. The GPS-enabled timepiece of claim 13, wherein a local oscillator drift is used to predict the time arrival of the GPS message.

16. The GPS-enabled timepiece of claim 13, wherein a position determined by the GPS receiver is displayed on the timepiece.

* * * * *